United States Patent
Naguib et al.

(10) Patent No.: US 11,223,956 B2
(45) Date of Patent: Jan. 11, 2022

(54) DYNAMIC DATA SEQUENCE PUNCTURING

(71) Applicant: Apple Inc., Cupertino, CA (US)

(72) Inventors: Ayman F. Naguib, Cupertino, CA (US); Arun Yadav, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 16/774,165

(22) Filed: Jan. 28, 2020

(65) Prior Publication Data

US 2021/0099863 A1    Apr. 1, 2021

Related U.S. Application Data

(60) Provisional application No. 62/907,388, filed on Sep. 27, 2019.

(51) Int. Cl.
| | |
|---|---|
| H04L 29/06 | (2006.01) |
| H04W 12/63 | (2021.01) |
| H04B 17/336 | (2015.01) |
| H04W 12/06 | (2021.01) |
| H04W 12/033 | (2021.01) |

(52) U.S. Cl.
CPC .......... *H04W 12/63* (2021.01); *H04B 17/336* (2015.01); *H04W 12/033* (2021.01); *H04W 12/06* (2013.01)

(58) Field of Classification Search
None
See application file for complete search history.

(56) References Cited

U.S. PATENT DOCUMENTS

| | | | | |
|---|---|---|---|---|
| 7,218,901 | B1 * | 5/2007 | Mobley | H04L 12/2801 |
| | | | | 455/182.2 |
| 8,843,643 | B2 * | 9/2014 | Larson | H04L 63/0272 |
| | | | | 709/227 |
| 8,874,771 | B2 * | 10/2014 | Munger | H04L 61/2092 |
| | | | | 709/230 |
| 2009/0291686 | A1 * | 11/2009 | Alpert | H04W 36/0085 |
| | | | | 455/436 |
| 2018/0254870 | A1 * | 9/2018 | Dutz | H04L 27/0014 |

(Continued)

OTHER PUBLICATIONS

Okamoto, Eiji et al. Sparse chaos code multiple access scheme achieving larger capacity and physical layer security. 2017 20th International Symposium on Wireless Personal Multimedia Communications (WPMC). https://ieeexplore.ieee.org/stamp/stamp.jsp?tp=&arnumber=8301884 (Year: 2017).*

(Continued)

*Primary Examiner* — Jeremiah L Avery
(74) *Attorney, Agent, or Firm* — Kilpatrick, Townsend & Stockton

(57) ABSTRACT

Techniques are provided for transmitting a secure frame by a wireless device. For example, the wireless device may determine a location within a data sequence of a secure frame to puncture the data sequence with a puncture. The wireless device may then generate the secure frame that includes the punctured data sequence and transmit the secure frame to a second wireless device. The second wireless device may then authenticate the secure frame based at least in part on the location of the puncture within the punctured data sequence.

22 Claims, 7 Drawing Sheets

(56) References Cited

U.S. PATENT DOCUMENTS

2019/0281587 A1* 9/2019 Zhang .................. H04L 5/0053

OTHER PUBLICATIONS

Aljohani, Abdulah Jeza et al. Distributed Source Coding and Its Applications in Relaying-Based Transmission. IEEE Access, vol. 4. https://ieeexplore.ieee.org/stamp/stamp.jsp?tp=&arnumber=7423654 (Year: 2016).*

Sedlacek, Petr et al., "An Overview of the IEEE 802.15.4z Standard and its Comparison to the Existing UWB Standards." 2019 $29^{th}$ International Conference Radioelektronika, Pardubice, Czech Republic, 2019, pp. 1-6.

* cited by examiner

DYNAMIC DATA SEQUENCE PUNCTURING

CROSS-REFERENCE TO RELATED APPLICATION

This application claims priority to U.S. Provisional Application Ser. No. 62/907,388 filed Sep. 27, 2019, entitled "Dynamic Data Sequence Puncturing," which is incorporated herein by reference in its entirety.

BACKGROUND

Wireless devices can employ short-range wireless network applications for many different tasks. For example, a wireless device (e.g., a key fob) may be configured such that when the device comes within a certain proximity of a vehicle (e.g., a car), the doors of the vehicle are automatically unlocked. In many cases, it is critical to ensure that secure communications are maintained between devices, to guard against attackers interfering with tasks. However, it can be difficult to balance between the need for secure communications and the continuously changing wireless environment conditions, such as a fluctuating signal-to-noise ratio (SNR).

BRIEF SUMMARY

Embodiments of the present disclosure can provide techniques for transmitting a secure frame by a device. In some examples, a first computing device (e.g., a mobile phone, a wearable device, etc.) may determine puncturing parameters for sending a secure frame to a second computing device (e.g., a sensor device connected to a lock). The puncturing parameters may be used to determine a location within a data sequence of the secure frame to puncture the data sequence with a puncture (e.g., zeroing out bits at the location within the data sequence). The first computing device may then generate the secure frame that includes the punctured data sequence and transmit the secure frame to the second computing device. The second computing device may then authenticate the secure frame based at least in part on the location and/or the length of the puncture within the punctured data sequence.

In some embodiments, a computer-implemented method for transmitting a secure frame by a first computing device (e.g., a mobile phone, a wearable device, etc.) may be provided. In some embodiments, the method may include wirelessly transmitting the secure frame. The method may include generating a data sequence. The method may also include determining a location within the data sequence of a secure frame (e.g., a secure ranging frame utilizing an ultra-wideband (UWB) protocol) to puncture the data sequence. The method may include puncturing the data sequence at the location. The method may also include generating the secure frame that includes the punctured data sequence. Finally, the method may include transmitting the secure frame to a second computing device (e.g., an access control system such as a keyless entry system) for authentication by the access control system. In some embodiments, the authentication is based at least in part on the location and/or the length (e.g., of the puncture) within the punctured data sequence. In some embodiments, the method may include receiving information that identifies that a resource or function of the access control system (e.g., unlocking doors) has been granted based at least in part on the authentication.

In some embodiments, the data sequence is a cryptographically generated sequence of bits, whereby both the first device and the second device are configured to derive the data sequence. Additionally, in some embodiments, the location within the data sequence may indicate at least one of: (1) a position within the data sequence to initiate the puncturing, or (2) a length of the puncture. In some embodiments, the puncturing parameters are determined based at least in part on a range between the first device and the second device. In some embodiments, the range may be associated with a SNR of a signal. Also, puncturing the data sequence may include zeroing out one or more bits of the generated data sequence. In some embodiments, the zeroed out bits may correspond to the puncture. In some embodiments, the puncture is initiated at the position and continues for the length within the punctured data sequence.

In some embodiments, a first device configured to wirelessly transmit a secure frame may be provided. The first device may include a processor and a memory. The memory may include instructions that, when executed with the processor, cause the first device to at least generate a data sequence. The instructions may further cause the processor to determine a location within the data sequence of a secure frame to puncture the data sequence. The processor may further puncture the data sequence with a puncture based at least in part on the location. The processor may generate the secure frame that includes the punctured data sequence. Next, the processor may transmit the secure frame to a second device for authentication. In some embodiments, the authentication is based at least in part on the location of the puncture within the punctured data sequence.

In some embodiments, the location is determined based at least in part on a range between the first device and the second device. Also, the range may be determined by the first device or received from the second device. In some embodiments, the second device may authenticate the secure frame based on at least one of verifying the position or verifying the length of the puncturing within the data sequence.

In some embodiments, the instructions further cause the first device to receive from the second device a puncturing parameters message that includes the location for puncturing the data sequence. In some embodiments, the first device may transmit to the second device puncturing parameters for performing authentication of the secure frame, whereby the puncturing parameters includes the location of the puncture within the punctured data sequence.

In some embodiments, the instructions further cause the first device to receive from the second device a second puncturing parameters message including updated puncturing parameters for puncturing a second data sequence of a second secure frame. The first device may then determine an updated location within the second data sequence of the second secure frame to puncture the second data sequence based at least in part on the updated puncturing parameters. In some embodiments, the updated puncturing parameters may be determined based at least in part on an updated range between the first device and the second device. In some embodiments, the updated range is different from the range. Also, in some embodiments, the updated location corresponds to a different location in the punctured second data sequence from the location in the punctured data sequence. In some embodiments, the updated location is determined on a per-cycle basis or a per-session basis.

In some embodiments, the instructions further cause the first device to generate a second data sequence. The first device may then determine a second location within the second data sequence of a second secure frame to puncture the second data sequence, the second location different from the location. The first device may then puncture the second data sequence with a second puncture based at least in part on the second location. The first device may then generate the second secure frame that includes the punctured second data sequence. Next, the first device may transmit the second secure frame to a third device for authentication. In some embodiments, the authentication based at least in part on the second location of the second puncture within the punctured second data sequence.

In some embodiments, a difference between the second location from the location corresponds to at least one of: (1) a second position of the second puncture within the punctured second data sequence being different from a position of the puncture within the punctured data sequence, or (2) a second length of the second puncture within the punctured second data sequence being different from a length of the puncture within the punctured data sequence.

In some embodiments, the instructions further cause the first device to generate an updated data sequence that is puncture-free. The first device may then generate an updated secure frame that includes the updated data sequence. The first device may transmit the updated secure frame to the second device for authentication based at least in part on the updated data sequence. In some embodiments, the second device may authenticate the secure frame independent of the puncture within the punctured data sequence.

In some examples, a computer readable medium may be provided. The computer readable medium may include instructions that, when executed by a processor of a computing device, cause the computing device to at least generate a data sequence. The processor may then determine a location within the data sequence of a secure frame to puncture the data sequence. The processor may puncture the data sequence with a puncture based at least in part on the location. In some embodiments, the processor may generate the secure frame that includes the punctured data sequence. The processor may then transmit the secure frame to a second device for authentication. In some embodiments, the authentication may be based at least in part on the location of the puncture within the punctured data sequence.

In some embodiments, the punctured data sequence may include at least three portions: (1) a first segment, (2) the puncture, and (3) a second segment. In some embodiments, the puncture is included at the location within the data sequence between the first segment and the second segment. Also, in some embodiments, the respective locations of the first segment and the second segment may be derivable based at least in part on the location of the puncture. In some embodiments, at least one of: (1) a length of the first segment, or (2) a length of the second segment is determined based at least in part on an acceptable signal-to-noise (SNR) for authenticating the secure frame. In some embodiments, the punctured data sequence includes a plurality of punctures, whereby the puncture is included within the plurality of punctures. In some embodiments, the plurality of punctures are at least one of: (1) unequally spaced from one another within the punctured data sequence, or (2) of different respective lengths from one another.

DETAILED DESCRIPTION

Figure 1:
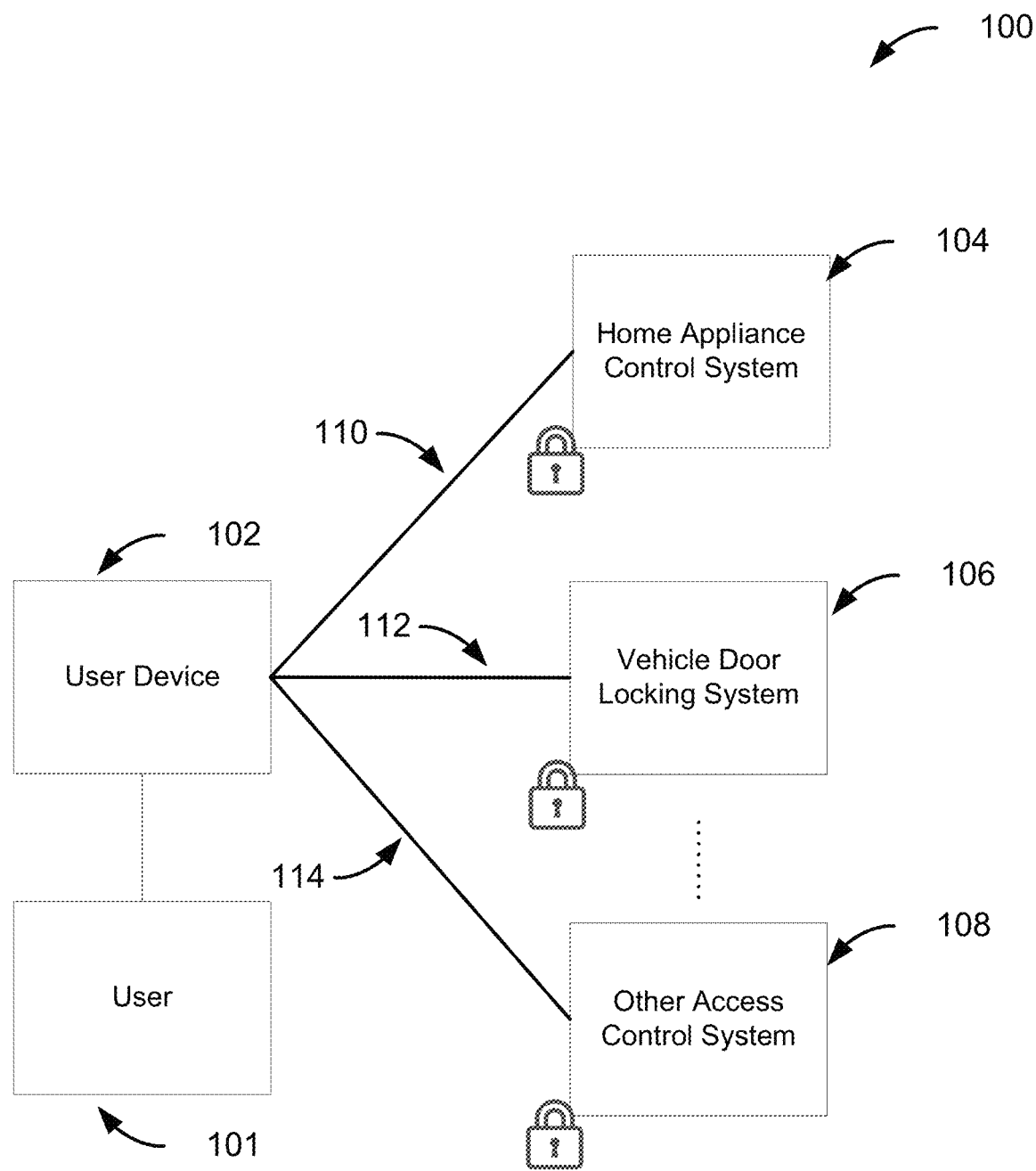
FIG. 1 is a simplified block diagram of an example system, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, wirelessly transmitting a secure frame by a computing device. In some examples, a first computing device (e.g., a mobile device, a wearable device, a key fob, a token, etc.) may determine puncturing parameters for sending a secure frame to a second computing device (e.g., a sensor associated with a locking or access system). The puncturing parameters may be used to determine a location within a data sequence of the secure frame to puncture the data sequence (with a puncture). The first computing device may then generate the secure frame that includes the punctured data sequence and transmit the secure frame to the second computing device. The second computing device may then authenticate the secure frame based at least in part on the location and/or length of the puncture within the punctured data sequence.

In some embodiments, the transmission of the secure frame may be performed by the first computing device (also known as a "first device" or "sender") using a protocol suitable for ranging (e.g., IEEE 802.15.4z standard utilizing UWB). As discussed herein, "ranging" may correspond to an estimation of distance between two wireless devices based on message time-of-flight. "Secure ranging" may refer to a process for performing ranging in a secure manner, for example, to use a mobile device to unlock a door or otherwise enable access. However, secure ranging can be used to perform any range-based function or operation. In a ranging example, the first computing device may determine ranging parameters that are used by the first computing device to generate the secure frame (e.g., a secure ranging frame). For example, the ranging parameters may include specifying a format for ranging messages between the first computing device and the second computing device, a frequency range to use, a number of antenna units, encryption protocols for ranging messages, as well as puncturing parameters, etc. In some embodiments, these ranging parameters may also be exchanged with a second computing device (also known as a "second device" or "receiver"). The secure frame format may include multiple fields that may be utilized by the second computing device to process the secure frame. One of the fields within the secure frame format may be a data sequence (e.g., a "scrambled time sequence," "scrambled timestamp sequence," "secure training sequence," or "STS"). In some embodiments, the data sequence may be a cryptographically generated data sequence of symbols (e.g., a sequence of bits generated according to a key and a seed) that may provide a level of security when transmitting the secure frame. In the case where ranging parameters may include one or more puncturing parameters, the puncturing parameters may be utilized to determine a location within the data sequence to puncture the data sequence, thus providing an additional level of security. For example, the one or more puncturing parameters may be used to determine a position within the data sequence to initiate the puncturing (e.g., an offset from the start of the data sequence) and a length (e.g., a time interval and/or number of bits) of the puncture. In an example, the puncture may correspond to a continuous string of bits set to "0" value. Upon puncturing the data sequence, the punctured data sequence may include (1) a first segment, (2) the puncture, and (3) a second segment. The puncture may be included at the location within the data sequence between the first segment and the second segment. Upon generating the secure frame that includes the punctured data sequence, the first device may transmit the secure frame to the second device. The second device may authenticate the secure frame based at least in part on the location (e.g., initial position and length) of the puncture within the secure frame.

In some embodiments, the one or more puncturing parameters may be used to determine whether to enable or disable puncturing when generating a data sequence within a secure frame. Furthermore, in the case when puncturing should be enabled, the puncturing parameters used to determine the location to puncture the data sequence may vary according to different embodiments. In some embodiments, the puncturing location (e.g., initial position and/or length of the puncture) may be changed with each new secure frame being sent (e.g., with each new frame cycle). In other embodiments, the puncturing location may remain the same for a given session that includes multiple secure frames being sent or received. In still other embodiments, the puncturing location may be changed dynamically and/or periodically. In some embodiments, the sender may be the device that initiates a request to enable puncturing (e.g., to send a secure frame to the receiver with sensitive contents). In other embodiments, the receiver may initiate a request to enable puncturing (e.g., to ensure that the message is authentic), and therefore may send a puncturing parameters message to the sender with instructions to enable puncturing of a secure frame (that is subsequently sent by the sender to the receiver for authentication).

In some embodiments, the determination of whether to enable or disable puncturing may be based at least in part on ranging parameters (e.g., a range between the sender and the receiver). For example, the sender and receiver may exchange wireless signals (e.g., respectively corresponding to a ranging request message and a ranging response message) that are used by at least one of the devices to determine a range between the sender and the receiver. In an example where the receiver determines to enable puncturing, the receiver may send a puncturing parameters message that includes one or more puncturing parameters, whereby the puncturing parameters are based on the range. For example, based on the range, the puncturing parameters may indicate the location at which to puncture the data sequence. This may include determining whether to lengthen or shorten the puncture length. In some examples, the puncture position and/or length may correspond to a desired SNR for performing a consistency check, confidence level check, and/or a channel estimation based at least in part on the secure frame. It should be understood that once the parameters for the location (e.g., position and length) of the puncture are determined, the parameters for the first segment and the second segment may also be derived (and vice versa).

In an illustrative example, consider a scenario in which the first device may correspond to a mobile device (e.g., mobile phone, wearable device) possessed by a user. The second device may correspond to a sensor device that is connected to an access control system (e.g., a vehicle door locking system of a vehicle, an access control system, etc.). In this example, the mobile device may correspond to the sender and the vehicle may correspond to the receiver. A user may have the mobile device on their person while approaching the vehicle from a first distance. At this first distance, the mobile device and the vehicle may exchange signals (e.g., over UWB) that enable the vehicle to determine the first distance. Based on the determined first distance, the vehicle may initiate a request to enable puncturing of a data sequence (e.g., STS) of a secure frame (e.g., secure ranging frame). The vehicle may transmit a puncturing parameters message (e.g., over Bluetooth Low Energy (BLE), WiFi, or UWB) to the mobile device with puncturing parameters for puncturing the data sequence. In some examples, these puncturing parameters may be shared only between the mobile device and the second device to ensure secure communications. For example, the puncturing parameters message may be encrypted. Once the mobile device receives the puncturing parameters, it may determine whether and how to puncture the data sequence when transmitting the secure frame. The mobile device may then generate the secure frame accordingly and transmit the secure frame to the second device. After the second device receives the secure frame, the second device may authenticate the secure frame based at least in part on verifying that the puncture details (e.g., position and length) matches the puncturing parameters previously determined by the second device. In some embodiments, upon authenticating the frame, the second device may enable access to a resource (e.g., unlocking a vehicle door).

Continuing with the above illustration, the second device may subsequently determine that the mobile device is at a second distance that is nearer than the first distance. The second device may determine, based at least in part on a predetermined wireless link performance level (e.g., an acceptable SNR) and a predetermined level of security, to update the location of the puncture and send updated puncturing parameter(s) to the mobile device for puncturing a second data sequence of a second secure frame. For example, the updated location may correspond to a change in the length and/or position of the puncture within the second data sequence. In another example, the updated puncturing parameter(s) may specify puncturing the second data sequence with multiple punctures. In some embodiments, the multiple punctures may be unequally spaced from one another within the punctured data sequence. In other embodiments, the multiple punctures may have different respective lengths from one another. These one or more updates may provide a higher level of security within an acceptable loss of wireless link performance. By varying the parameter(s) for puncturing the data sequence, the second device (and user) may have increased protection against an attacker that attempts to fraudulently impersonate the mobile device and obtain access to the vehicle.

It should further be understood that, just as puncturing may be enabled as the range decreases between the mobile device and the second device, puncturing may be disabled as the range increases. For example, as the mobile device becomes farther from the second device, the second device and/or mobile device may determine that an acceptable level of security decreases (e.g., no critical information being exchanged, no resource access request being authenticated, etc.). In another example, the second device may determine that the SNR is lower (e.g., due to the increased distance or other signal interference). In either case, the second device may thus determine to disable puncturing to achieve better link performance. In this way, the second device (e.g., initiator) may balance between the desire for greater link performance and greater security when performing authentication via secure ranging. It should be understood that the determination of enabling or disabling puncturing, as well as determining the frequency of updating the parameters (e.g., location) of the puncturing, may be determined using any suitable method, according to embodiments disclosed herein.

In some embodiments, there may be multiple sender-receiver pairs (e.g., involving multiple senders and/or multiple receivers) in which secure frames are being transmitted. In an illustrative example, multiple mobile devices (e.g., mobile phones) may be used to obtain access to an access control system (e.g., accessing a home appliance control system). Each of these mobile devices may respectively transmit a secure frame to the home appliance control system utilizing a different set of puncturing parameters. For example, the location of the punctures within the data sequences of the respective secure frames being sent to the home appliance control system by respective mobile devices may be different, thus increasing a level of secure communications.

In another example, some devices may not be configured to authenticate a secure frame based at least in part on a puncture within a data sequence, while other devices may be configured to authenticate a secure frame based at least in part on puncturing. A sender may transmit a secure frame that may be received by these multiple devices. In this case, the non-configured receiving device may still authenticate the secure frame independent of the puncturing (e.g., treating the puncture as signal noise), while other configured receiving devices may authenticate based at least in part on the puncturing. In this way, embodiments of the present disclosure are able to operate in a heterogeneous environment in which devices present different levels of capability when processing secure frames with punctured data sequences.

While examples are given herein where the user device is a mobile device (e.g., mobile phone, wearable, etc.), any electronic device may be configured to perform the features described herein. For example, the user device may be a token, a key fob, a portable audio or video device, a tablet computer, a portable computer, or the like. Further, while the receiving device may be described as an access control system (e.g., a vehicle locking system, an automatic home door locking system, etc.) in some examples, it should be understood that any suitable computing device may be used to implement embodiments described herein. As a non-limiting example, this may include wireless sensors connected to resources (e.g., lightbulbs, smart plugs, electronic devices, appliances, displays, controls, etc.). It should be understood that the technical advantages of the present disclosure may be applicable to any suitable sender or receiver computing device. It should be understood that, although embodiments of the present disclosure are described with reference to one or more puncturing parameters in a ranging context (e.g., as an example ranging parameter), embodiments should not be construed to be limited to a ranging context. For example, puncturing parameters may be used within any suitable context, including, but not limited to, pairing devices, sharing keys, transmitting passwords, general data transfer, etc. Furthermore, the puncturing parameters may be used within any suitable protocol, including, but not limited to, UWB, BLE, Wi-Fi, etc.

Embodiments of the present disclosure provide for a number of technical advantages. In one non-limiting example, using conventional techniques, a user may transmit a secure frame that includes a cryptographically generated data sequence (e.g., an STS within a secure ranging frame under the 802.15.4z standard). Additionally, the data sequence may be segmented into fixed segments, whereby the segmentation is performed on a regular interval. For example, a data sequence may be split into two segments (or more) of equal length. However, inherent in this method of segmentation is a level of predictability, whereby an attacker may be able to determine the parameters by which a data sequence was segmented. In this way, an attacker could send a fraudulent frame whereby the data sequence is segmented such that the receiver may authenticate the frame as being from an authentic source. In contrast, embodiments of the present disclosure utilize an approach to segmentation involving dynamic puncturing, whereby a data sequence is punctured at a location that, for any given instance, is not easily predictable. For example, the location of the puncturing may be changed (e.g., dithered) over time in a pattern that is known only to participating devices, thus adding a more robust level of security than conventional methods.

In another example, the puncturing may be enabled or disabled based at least in part on a determination of the wireless link performance and a need for greater security. For example, if the link signal is determined to be of poor quality (e.g., because of a greater distance or signal interference between the sender and receiver), puncturing may be disabled in order to achieve greater link performance (e.g., higher SNR). Conversely, if the signal quality is acceptable (e.g., because the sender and receiver are in closer proximity), and, especially if secure communications are essential (e.g., automatically unlocking a car door as a user approaches), puncturing may be enabled on demand. Thus, embodiments of the present disclosure enable dynamic balancing between competing interests of greater link performance and greater security. Yet another advantage of the present disclosure is that the method supports one-to-many ranging (e.g., one initiator with many responders) with different puncturing parameters being used by different responders, thus providing greater security. Also, receiving devices that are not configured to authenticate based at least in part on puncturing may nevertheless process a punctured secure frame (e.g., treating the puncture as normal noise), thus providing greater heterogeneity in a wireless environment.

FIG. 1 shows an example block diagram of a system for wirelessly transmitting a secure frame, according to at least some embodiments. The system 100 includes a user device 102 that is operated by a user 101. The user device 102 may transmit a secure frame to one or more computing devices (e.g., access control systems 104-108), respectively, via one or more wireless signals 110-114.

In some embodiments, user device 102 may correspond to any suitable electronic device. User device 102 may also provide remote communication capabilities to a network. For example, a user device may be a personal computer (PC). A "mobile communication device" may be an example of a "user device" that can be easily transported. Examples of remote communication capabilities include exchanging data between devices over short and/or medium ranges. For example, this may include signal transmission via impulse radio (IR) UWB or via chirp spread spectrum (CSS). Other examples may include signal transmission utilizing a Bluetooth standard (e.g., BLE)). Other examples of remote communication capabilities include using a mobile phone (wireless) network, wireless data network (e.g. 3G, 4G or similar networks), Wi-Fi, or any other communication medium that may provide access to a network, such as the Internet or a private network. Examples of mobile communication devices include mobile phones (e.g. cellular phones), key fobs, PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as vehicles with remote communication capabilities. It should be understood that a user device may be able to communicate with other devices using more than standard (e.g., BLE and UWB) and/or more than one radio.

In some embodiments, each of the access control systems 104-108 may be representative of example computing devices with remote communication capabilities. In some embodiments, the remote communication capabilities for the different access control systems (e.g., 108) may be substantially similar to that described in reference to user device 102 above. For example, as depicted in FIG. 1, home appliance control system 104 may correspond to a computing device that controls access to one or more appliances in a home (e.g., light switch, thermostat, deadbolt, etc.). The computing device may be connected to one or more sensors that are able to communicate with user device 102. For example, when the user 101 brings the user device 102 near a sensor of the home appliance control system 104, the user device 102 may transmit a wireless signal 110, e.g., over UWB, to the home appliance control system 104. The wireless signal 110 may be a medium for transmitting a secure frame (e.g., a secure ranging frame) that the home appliance control system 104 authenticates utilizing a method described in an embodiment herein. Upon authentication, the home appliance control system 104 may grant the user device 102 access to a resource (e.g., automatically turning on a light switch to illuminate a room). In another example, vehicle door locking system 106 may correspond to a computing device that controls access to a vehicle. The vehicle door locking system 106 may receive and authenticate a secure frame sent by the user device 102, upon which the vehicle door locking system 106 may grant access to the resource (e.g., unlocking the door, starting the vehicle engine, etc.). As depicted in FIG. 1, there may be a variety of other access control systems 108 that the user device 102 may communicate with to gain access to one or more resources (e.g., turning on a PC, logging into a computer, etc.).

It should be understood that, although as described in several examples herein, the user device 102 may be referred to as a "sender" and an access control system (104-108) may be referred to as a "receiver," embodiments should not be construed to be so limiting. For example, an access control system may operate as a sender and a user device 102 may operate as a receiver of a secure frame. Also, in some embodiments, either the sender or the receiver may serve as an "initiating" device. The initiating device may determine for example, to enable/disable puncturing. It may also determine puncturing parameters for puncturing a data sequence. The "responding" device may correspond to the sender that transmits the secure frame. In some embodiments, the initiator and the sender may be the same device. Furthermore, in some embodiments, the device receiving and authenticating the secure frame may not be providing access to a resource upon authentication, but may instead perform one or more other suitable operations (e.g., transmitting an authentication acknowledgement back to the user device 102).

The user device 102 may transmit signals to each access control system within different respective environments. For example, the user device 102 may be farther away from a vehicle in a driveway associated with vehicle door locking system 106, but relatively closer to the home appliance control system 104. The vehicle door locking system 106 and the home appliance control system 104 may still be able to authenticate secure frames received by each device, for example, by varying puncturing parameters of the secure frame transmitted by each device, as described further herein. In another example, the user device 102 may be in an environment with a variety of other user devices and/or vehicles (e.g., with respective vehicle door locking systems), such as in a crowded parking lot. The environment can be characterized by varying levels of interference, e.g., RF interference. Accordingly, the user device 102 can receive one or more updated puncturing parameters in order to account for a changing link budget. As described herein, a "link budget" may refer to an accounting of gains and losses from a sender through a medium (e.g., free space) to a receiver in a networking system (e.g., a wireless environment).

It should further be understood that the user device 102 may utilize one or more types of signals to communicate with any given system. For example, the user device 102 may transmit a wireless signal 110 using a BLE protocol to exchange ranging capabilities, cryptographic keys, and/or other parameters for communication with home appliance control system 104. Meanwhile, the user device 102 may also use another type of wireless signal 110 (e.g., IEEE 802.15.4z standard using UWB) to communicate with home appliance control system 104 to communicate ranging information, e.g., utilizing one or more of the parameters exchanged via the BLE protocol.

Figure 2:
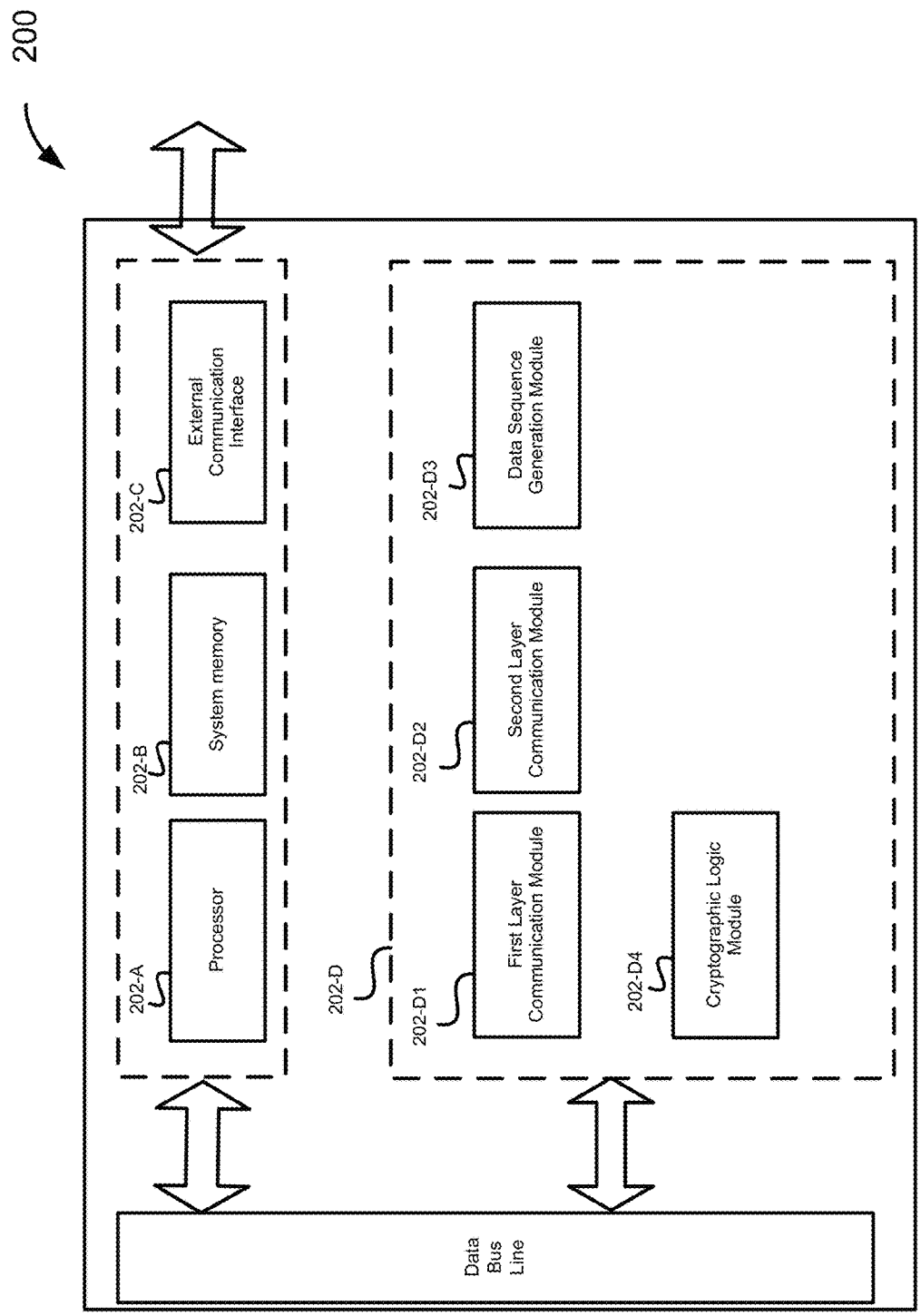
FIG. 2 is another simplified block diagram illustrating an example device of the system, which is capable of transmitting or receiving a secure frame, according to some embodiments.

FIG. 2 shows an example block diagram of a device 200 of a system that is respectively capable of transmitting or receiving a secure frame, according to at least some embodiments. Accordingly, it should be understood that the components of device 200 may be applicable to a device operating in either capacity (sender/receiver and/or initiator/responder).

In some embodiments, the device 200 may be a communication device (e.g., a mobile phone) that can be used to transmit one or more secure frames to a receiver for authentication. The device 200 may comprise a processor 202-A that may be coupled to a system memory 202-B and an external communication interface 202-C. A computer-readable medium 202-D may also be operatively coupled to the processor 202-A.

In some embodiments, the external communication interface 202-C may be coupled with a contactless element, which may typically be implemented in the form of a semiconductor chip (or other data storage element) with an associated wireless transfer (e.g., data transmission) element, such as an antenna. Data or control instructions that are transmitted via a cellular network may be applied to the contactless element by means of a contactless element interface. The contactless element may be capable of transferring and receiving data using a short range wireless communication capability. Thus, the device 200 may be capable of communicating and transferring data or control instructions via both cellular network (or any other suitable wireless network—e.g. the Internet or other data network) and short range communications (e.g., UWB, BLE, etc.).

The computer-readable medium 202-D may comprise a number of software modules including a first layer (e.g., BLE) communication module 202-D1, a second layer (e.g., UWB) communication module 202-D2, a data sequence generation module 202-D3, and a cryptographic logic module 202-D4. While particular functions are discussed in reference to each module below, it should be understood that this is for illustration purposes only. Accordingly, any of the functions performed by modules referenced herein may be optional and/or combined with the functions of one or more other modules for performing embodiments of the present disclosure.

The first layer communication module 202-D1 may comprise code that causes the processor 202-A to generate messages, transmit messages, reformat messages, and/or otherwise communicate with other entities using a first wireless protocol (e.g., BLE, Wi-Fi, etc.). For example, in some embodiments, a sender (e.g., device 200 operating as a sender device) may be paired to a receiver (e.g., device 200 operating as a receiver device) using a BLE pairing. For example, the pairing may involve an authentication between the sender and the receiver via any one of various techniques. The pairing may result in a shared secret being saved on both devices, whereby the shared secret may be used for future authentications and/or encryption of messages between the mobile device and the vehicle over a secure channel. For example, as discussed further below, the shared secret may correspond to a key that is used to cryptographically generate a data sequence using the cryptographic logic module 202-D4, discussed further below. In some embodiments, a seed that is shared between both the sender and receiver may be used as input to a random bit generator (RBG) to cryptographically produce the data sequence (e.g., STS).

In some embodiments, the sender and receiver may further exchange messages to initiate ranging. For example, a ranging request message may be sent from either the sender or the receiver operating as an initiator. The responding device may respond with a start notification event (message), upon which ranging may be performed (e.g., via the second layer communication module 202-D2, discussed below). In some examples, the sender and receiver may exchange ranging parameters and/or puncturing parameters via the first layer communication module 202-D1, for example, over the secure channel. In a case where the receiver initiates ranging, the receiver may determine one or more puncturing parameters to transmit to the sender for sending a secure ranging frame to the receiver. The one or more puncturing parameters may include parameters for puncturing a data sequence (e.g., an STS or the like) with a puncture at a particular location. In an example, the puncturing parameters may specify the location by determining a position within the data sequence to initiate the puncturing, whereby the puncture is included between a first segment and a second segment of the data sequence (or at any location within the data sequence), described further below. The one or more puncturing parameters may also specify the length of the puncture. In some embodiments, the puncturing parameters may specify a length of a first segment of the data sequence and a length of the second segment of the data sequence. In some embodiments, the length of the first segment and the length of the second segment may be determined as a byproduct of determining the location of the puncture (e.g., not predefined). One skilled in the art would understand that by determining the position to initiate the puncture and the length of the puncture, the other parameters for the locations of the first segment and the second segment, respectively, may be derived (and vice versa). Any suitable mechanism may be used to specify the location of a puncture in a data sequence, and thus, the associated segments. In some embodiments, the one or more puncturing parameters may also specify whether multiple punctures should exist in a data sequence. In this example, the puncturing parameters may also be suitable to determine the position and/or length of each puncture. As described above, it should be understood that in some cases, the sender (instead of the receiver) may initiate ranging and determine the one or more puncturing parameters (e.g., a puncture position and/or length) for sending a secure ranging frame. In this case, prior to transmitting the secure ranging frame, the sender may transmit one or more puncturing parameters to the receiver over the secure channel via first layer communication module 202-D1 so that the receiver can properly authenticate the secure ranging frame upon receiving it.

In some embodiments, the sender and receiver may communicate over the secure channel via first layer communication module 202-D1 to agree on a cadence for determining an updated location and/or length to puncture a data sequence. In some embodiments, an updated location may be determined on a per session basis. As discussed herein, a "session" may refer to an interaction session that may terminate, for example, when the receiver performs some operation (e.g., the vehicle door locking system 106 of FIG. 1 unlocking a vehicle). In this example, the punctured location may remain the same throughout the session. It should be understood that a session-based puncturing cadence may provide greater security than conventional methods that may employ predictable uniform segmentation of a data sequence. In other embodiments, an updated location may be determined after each cycle. As discussed herein, a "cycle" may refer to a single ranging cycle (e.g., including a range request message and a range response message). This cadence may be preferred, for example, when a high level of secure communications is desired (e.g., the sender is within a closer threshold to the receiver (e.g., a vehicle door locking system 106 associated with a vehicle), and the vehicle door locking system 106 must determine whether to unlock the door). In some embodiments, an updated one or more puncturing parameters may be exchanged per cycle using a second wireless protocol (e.g., UWB, P2P, etc.) instead of the first wireless protocol (e.g., BLE, Wi-Fi, etc.). For example, the updated one or more puncturing parameters may be encrypted and sent as a payload in a prequel message that precedes one of the secure frames discussed below in reference to FIG. 3. In some embodiments, the updated one or more puncturing parameters may include any suitable information. For example, this may include an encryption key, puncture location information, dithering parameters for puncturing the data sequence (e.g., shifting the puncture up or down by a number of bits each cycle), etc. In some embodiments, the first wireless protocol or the second wireless protocol may be used based at least in part on the context (e.g., the intended purpose of the message being transmitted, the type of signal being transmitted, and/or the wireless protocol being used). For example, in a scenario where the first wireless protocol is BLE or the like and the second wireless protocol is UWB or the like, BLE or similar may be used in situations where interoperability with other applications on the same device is critical (e.g., exchanging and managing cryptographic keys). In contrast, UWB or other similar protocol may offer a narrower pulse signal that allows for better time-of-flight calculations, and thus may be used in situations where determining accurate distance (e.g., ranging) and/or location to another device is critical. Thus, as mentioned above, in an example where only the puncturing parameters (e.g., not the cryptographic key) are being updated per cycle within a ranging session, UWB or the like may be used to transmit the updated puncturing parameters. In some embodiments, any suitable usage of one or more protocols may be used to perform embodiments of the present disclosure.

The second layer communication module 202-D2 may comprise code that causes the processor 202-A to generate messages, transmit messages, reformat messages, and/or otherwise communicate with other entities using a second wireless protocol (e.g., UWB, P2P, etc.). For example, in some embodiments, the sender may perform ranging using the second wireless protocol. In some embodiments, the sender and receiver may first exchange messages to initiate ranging using the first wireless protocol (e.g., BLE) via the first layer communication module 202-D1, as described above. For example, these messages may include one or more puncturing parameters for puncturing a data sequence of a secure ranging frame. It should be understood that the second wireless protocol may also be used to transmit one or more of the puncturing parameters and/or initialization messages that were discussed in reference to first layer communication module 202-D1.

In some embodiments, following the ranging initiation, the sender may generate a secure ranging frame via the second layer communication module 202-D2. In some embodiments, the secure ranging frame may be one of multiple potential frame formats (e.g., according to the IEEE 802.15.4z standard), discussed further below with reference to FIG. 3. It should be understood that each of the frame formats may include a data sequence that may be punctured. As discussed above, the sender may puncture the data sequence according to the previously determined puncturing parameters (e.g., per cycle or per session). The sender may invoke the data sequence generation module 202-D3 to generate the data sequence (e.g., including puncturing) for inclusion within the secure ranging frame. Once the secure ranging frame is generated, the sender may transmit the frame via the external communication interface 202-C (e.g., via a UWB radio, antenna unit, etc.) to a receiver.

From the perspective of the receiver, the receiver may execute the second layer communication module 202-D2 to scan for ranging signals (e.g., via a UWB radio, antenna unit, etc.). The receiver may receive the secure frame and perform one or more tasks associated with fields within the frame, discussed further below with reference to FIG. 3. In some embodiments, the receiver may authenticate the secure frame based at least in part on verifying that a puncture within a data sequence of the secure frame is at a predefined location (e.g., at a particular position and/or of a particular length). Upon completing authentication, the second layer communication module 202-D2 may cause the receiver to perform any suitable operation (e.g., unlocking a lock). The second layer communication module 202-D2 may also be responsible for other tasks, including determining a link budget for channel estimation, performing a confidence level check, performing a consistency check, and/or a NULL hypothesis check, described further below in reference to FIG. 5. These checks may also be used to determine updated puncturing parameters for a subsequent ranging message (e.g., an updated puncture location, or puncturing parameters for disabling puncturing) based at least in part on a desired link budget for channel estimation).

The data sequence generation module 202-D3 may comprise code that causes the processor 202-A to generate a data sequence for inclusion within a secure ranging frame. In some embodiments, the data sequence may correspond to an STS included within an IEEE 802.15.4z frame format, as discussed further below in reference to FIG. 3. In some embodiments, the data sequence generation module 202-D3 may also be responsible for puncturing the data sequence at a particular location.

The cryptographic logic module 202-D4 may comprise code that includes any suitable encryption algorithms to encrypt (or cryptographically generate) data, according to embodiments of the disclosure. Suitable data encryption algorithms may include Data Encryption Standard (DES), tripe DES, Advanced Encryption Standard (AES), etc. It may also store encryption keys that can be used with such encryption algorithms. The cryptographic logic module 202-D4 may utilize symmetric or asymmetric encryption techniques to encrypt and/or verify data. As described earlier, the cryptographic logic module 202-D4 may be invoked (e.g., by the data sequence generation module 202-D3) to cryptographically generate a data sequence according to a key and/or seed. The cryptographic logic module 202-D4 may also be used to send encrypted messages (e.g., including ranging parameters and/or puncturing parameters) using the first layer communication module 202-D1 (e.g., via BLE) or the second layer communication module 202-D2 (e.g., via UWB, as a prequel message to a ranging frame).

Figure 3:
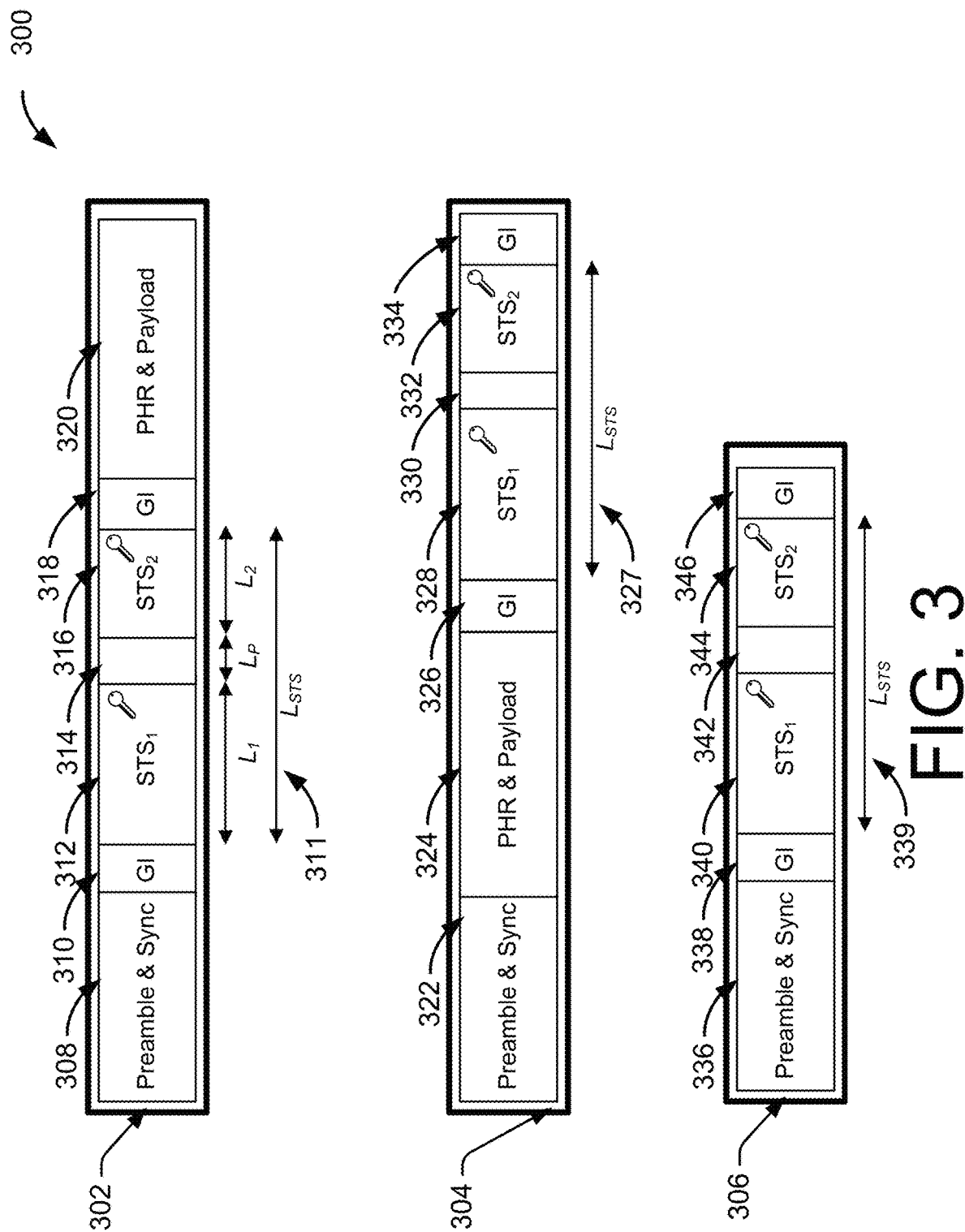
FIG. 3 is another simplified block diagram illustrating at least some example techniques for transmitting a secure frame, according to some embodiments.

FIG. 3 is another simplified block diagram illustrating at least some example techniques for transmitting a secure frame, according to at least some embodiments. In diagram 300, while the formats of three secure frames 302-306 are depicted, embodiments of the present disclosure should not be construed to be so limiting. For example, other formats involving a different number and/or type of data fields in a secure frame may be employed. In some embodiments, any one of the secure frame formats depicted in FIG. 3 may be suitable to be used for ranging between a sender (e.g., device 200 of FIG. 2 operating as a sender device) and a receiver (e.g., device 200 of FIG. 2 operating as a receiver device). In some embodiments, one or more of the fields of each of these formats may correspond to frame formatting according to the IEEE 802.15.4z standard, as described further below. In some embodiments the secure frame and the respective frame fields may be generated by one of the modules of FIG. 2. For example, the second layer communication module 202-D2 may generate the secure frame 302 (or 304, 306), while the data sequence generation module 202-D3 may generate (and optionally puncture) a data sequence to be included within the secure frame.

In a first secure frame 302 of FIG. 3, five sequential fields are depicted. In a first field, a preamble and synchronization (SYNC) 308 field may be included. In some embodiments, the preamble and SYNC 308 may correspond to a sequence of bits used by a receiver to detect the beginning of a frame, and/or to detect whether a frame is incoming. In some embodiments, the preamble and SYNC field may be otherwise referred to as a synchronization header (SHR) according to the IEEE 802.15.4z standard. Next, a guard interval (GI) 310 (or "gap") may be included. In some embodiments, the guard interval 310 may correspond to a period of time in which no signal is transmitted within a particular frequency band. The guard interval 310 may be used to ensure that distinct transmissions do not interfere with one another, or otherwise cause overlapping transmissions (e.g., immunizing against propagation delays, echoes, multipath error, etc.).

Next, a data sequence (e.g., an STS or the like) may be generated that spans a length 311 of $L_{STS}$, relative to the length of the secure frame 302. As described above, in some embodiments, the data sequence may correspond to an STS according to the IEEE 802.15.4z standard, where $L_{STS}$ corresponds to the length 311 of the data sequence. In some embodiments, the data sequence of length 311 may correspond to a non-repeatable sequence (e.g., of bits). In some embodiments, the data sequence may be cryptographically generated by the cryptographic logic module 202-D4 using any suitable mechanism. For example, the cryptographic logic module 202-D4 may receive as input a seed (e.g., secret value known by both sender and receiver devices). The cryptographic logic module 202-D4 may then apply the seed using a pseudo-random number generator (PRNG) to generate the data sequence. In some embodiments, the data sequence may be generated (e.g., derived) by either the sender or the receiver for a given set of one or more puncturing parameters. In some embodiments, the data sequence may not be cryptographically generated.

Figure 4:
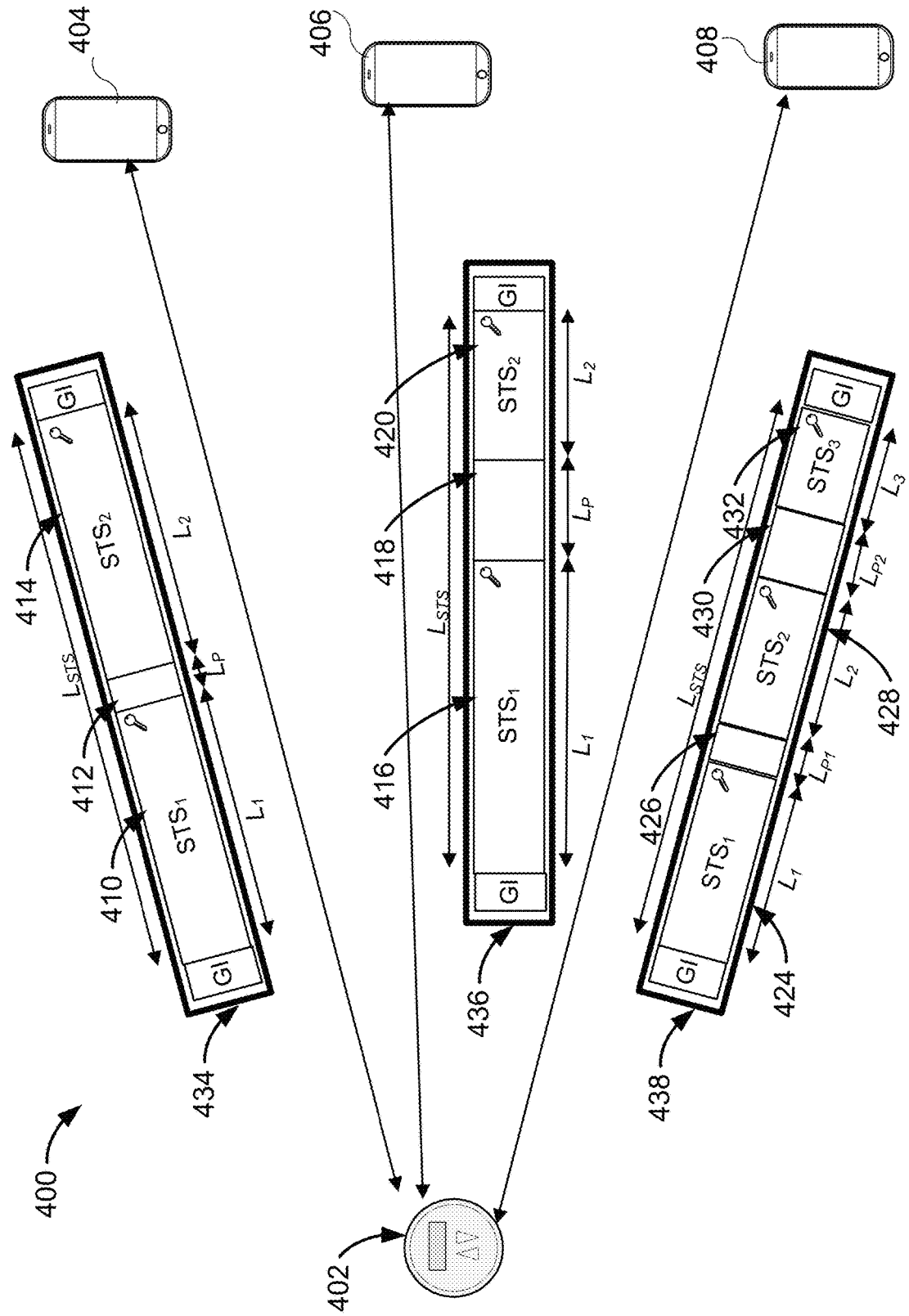
FIG. 4 is another simplified block diagram illustrating at least some example techniques for transmitting a secure frame, according to some embodiments.
Figure 5:
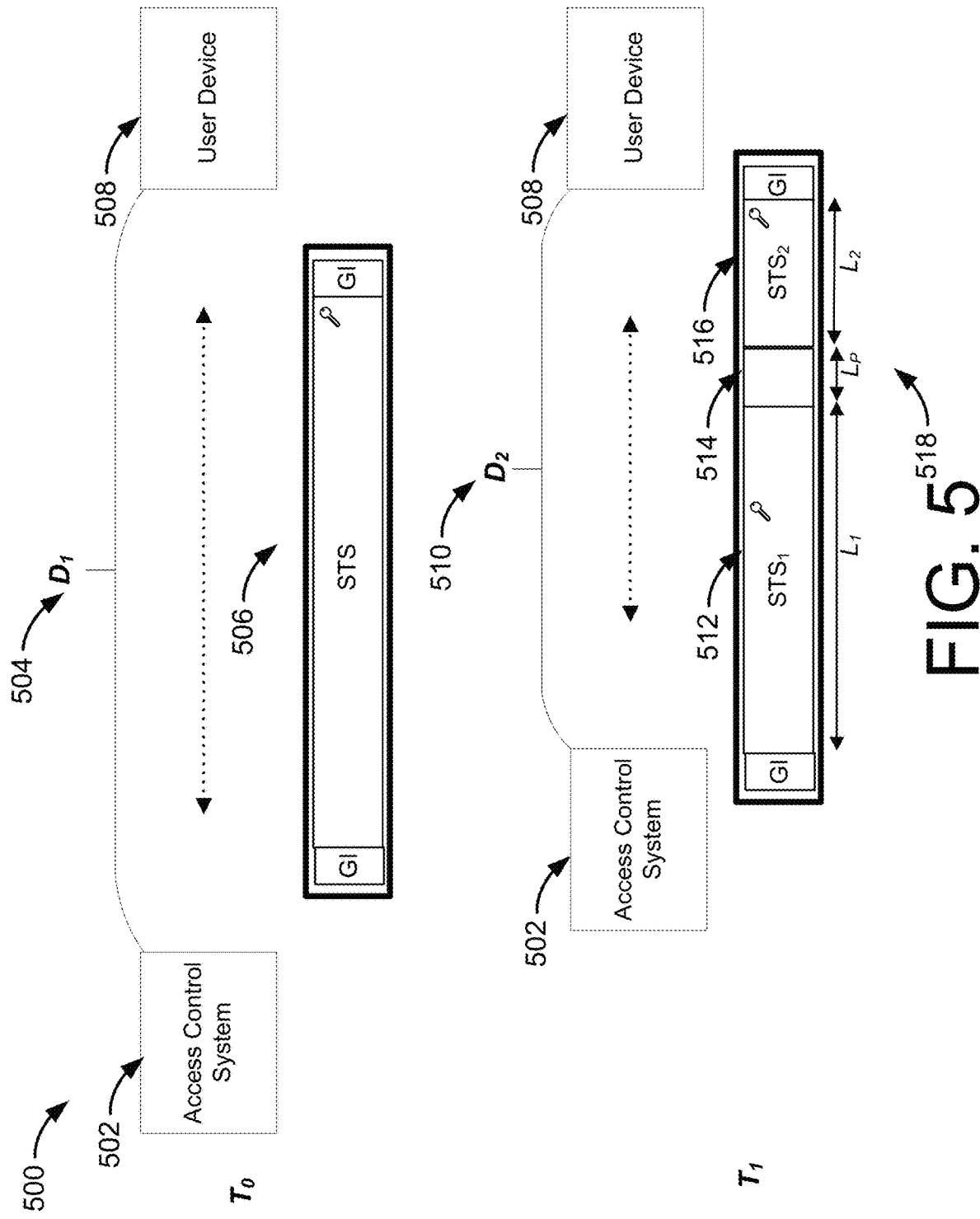
FIG. 5 is another simplified block diagram illustrating at least some example techniques for transmitting a secure frame, according to some embodiments.

Upon generating the data sequence, the data sequence may be punctured with a puncture. For example, the punctured data sequence may include at least three portions: (1) a first segment (e.g., $STS_1$) 312 of length $L_1$, the puncture 314 of length $L_p$, and a second segment (e.g., $STS_2$) 316 of length $L_2$. In some embodiments a length L may correspond to a certain time interval (e.g., 1 μs). As depicted in FIGS. 3-5, $L_1$ may correspond to the length of a first segment (1), $L_2$ may correspond to a length of a second segment (2), $L_p$ may correspond to a length of a puncture (p), and $L_{STS}$ may correspond to a length of a data sequence (e.g., an STS). For example, a first segment 312 of length $L_1$ may correspond to an interval of time of length $L_1$ in which a pulsing signal is continuously transmitted (e.g., non-zero pulsing). In some embodiments, the pulsing signal may be translated into a sequence of bits. The puncture 314 may correspond to a location between first segment 312 and second segment 316 to puncture the data sequence of length 311. In some embodiments, the location of puncture 314 may correspond to a length of time $L_p$ in which bits that would otherwise be transmitted as part of the secure frame 302 are zeroed out. In other embodiments, the punctured bits may correspond to omitted bits that would otherwise be transmitted in the data sequence. In some embodiments, the location of the puncture 314 may also correspond to a position within the data sequence of length 311 to initiate the puncturing (e.g., an offset from the start of the data sequence of length 311).

It should be understood that this method of puncturing (e.g., zeroing out bits or omitting bits) is different from conventional techniques for performing segmentation of a data sequence. For example, whereas conventional techniques may divide a data sequence of length 311 into two segments (whereby the conjoining of the two segments recreates the initial data sequence), in embodiments described herein, the puncturing may zero out (or omit) bits that are part of the data sequence. Accordingly, to a receiver who is unaware of the parameters for performing the puncturing (e.g., a device not configured to process punctured data sequences, or an attacker), the puncture may look like signal noise. In other embodiments, and as described further below in reference to FIGS. 4 and 5, the location of the puncture 314 may be dynamically updated, thus introducing further unpredictability to guard against an attacker. Analogous to first segment 312, the second segment 316 may be of length L2 and may follow the puncture 314 to complete the full length ($L_{STS}$) 311 of the data sequence.

Following the punctured data sequence (312-316), another GI 318 may be included. Finally, physical layer header (PHR) and payload 320 may be included. In some embodiments, the PHR may include information that is used to decode the payload. In some embodiments, the payload may include any suitable data, including, but not limited to, identification information about the sender device and the receiver device, one or more timestamps, a cryptographic key, Global Positioning System (GPS) coordinates, or other ranging information (including one or more puncturing parameters).

Turning to a second secure frame 304, the format may be similar to secure frame 302. For example, the fields 310-318 of secure frame 302 may respectively be used for similar purposes as fields 326-334 of secure frame 304. Additionally, the preamble and SYNC 322 may be similar to preamble and SYNC 308. However, with this secure frame 304, the PHR and payload 324 may be shifted (e.g., compared to PHR and payload 320) to occur immediately following the preamble and SYNC 322.

Turning to a third secure frame 306, the format may also be similar to the first secure frame 302. For example, the fields 308-318 of secure frame 302 may respectively be similar to fields 336-346 of secure frame 306. However, in this case, a PHR and payload may be absent. It should be understood that, in the case of the third secure frame 306, since there is no PHR and payload, any ranging information (e.g., one or more puncturing parameters) used to perform the ranging may be transmitted prior to transmitting a secure frame using the third secure frame 306. For example, using secure frame 302 or secure frame 304, if a device intended to update the puncturing location for a next cycle (or session), those parameters could be sent as part of the payload (320 or 324, respectively). However, using secure frame 306, those parameters may be sent in advance.

In some embodiments, each of the formats of secure frames 302-306 may provide a higher level of security when performing secure ranging than conventional methods. For example, while conventional methods enable segmentation of a data sequence, an attacker could still observe a series of frames over time and potentially predict a pattern of the segmentation within a given data sequence. However, as described above for each of the frame formats, embodiments of the present disclosure provide yet another level of security (e.g., unpredictability via puncturing) on top of conventional frame formatting, data sequence segmentation methods, and or data sequence encryption methods.

FIG. 4 is another simplified block diagram illustrating at least some example techniques for utilizing puncturing to transmit a secure frame, according to at least some embodiments. In FIG. 4, a home appliance control system 402 (e.g., thermostat system) is depicted, which may be similar to home appliance control system 104 of FIG. 1 and/or device 200 of FIG. 2. Additionally, multiple user devices 404-408 are depicted as representative examples of user devices, which may each respectively correspond to user device 102 of FIG. 1 and/or device 200 of FIG. 2. Although mobile phones are depicted in FIG. 4, it should be understood that any suitable user device may be used to perform embodiments of the disclosure. Each user device 404-408 may obtain access to operate the home appliance control system 402 based at least in part on transmitting a secure ranging frame to the home appliance control system 402. In the embodiment depicted in FIG. 4, the home appliance control system 402 may be the initiator, while each of the user devices 404-408 are senders that function as responders. For clarity of illustration purposes, in FIG. 4, only the punctured data sequence (and encapsulating guard intervals) 434, 436, and 438 within each the respective secure ranging frames are depicted.

In some embodiments, the home appliance control system 402 may initiate a ranging procedure with user device 404. The home appliance control system 402 may transmit an encrypted puncturing parameters message (e.g., over BLE) with one or more puncturing parameters for the user device 404 to transmit a punctured data sequence 434. For example, the puncturing parameters message may include one or more parameters that allow the user device 404 to determine a location 412 (e.g., an initial position and/or length) to puncture a data sequence to generate punctured data sequence 434. In some embodiments, as described further below in reference to FIG. 5, the location may be determined based at least in part on a range between the user device 404 and the home appliance control system 402. The range may be associated with, for example, the SNR associated with signals transmitted between the user device 404 and the home appliance control system 402. In some embodiments, the location of the puncture may be determined independently of a range between the two devices.

In some embodiments, the home appliance control system 402 may also initiate a ranging procedure with mobile phone 406, which may be similar to as described above. However, in this example, a different puncturing location 418 may be used to transmit the punctured data sequence 436. For example, the initial position of location 418 may be at a farther offset from the start of the data sequence 436 as compared to the data sequence 434. Therefore, the first segment 410 of data sequence 434 may have a shorter length than the first segment 416 of punctured data sequence 436. Furthermore, the length of the location 418 may be longer than the length of the location 412. The second segment 420 may also have a shorter length compared to the second segment 414. In some embodiments, by enabling the puncturing parameters to vary between secure channels between devices, this may increase the security against at attacker by further increasing the unpredictability of each secure frame. Furthermore, as described earlier, the initiator may determine to update the puncturing parameters on a cadence (e.g., per ranging cycle, or per session). By enabling the ability to dynamically change the puncturing parameters for each device, embodiments of the disclosure may provide a greater degree of security than conventional segmenting methods.

In some embodiments, the home appliance control system 402 may also initiate a ranging procedure with user device 408, which may be similar to as described above. However, in this example, the home appliance control system 402 may require a yet increased level of security (e.g., allowing the user to perform a more critical operation to administer the home appliance control system 402). Accordingly, the home appliance control system 402 may determine puncturing parameters whereby a data sequence is punctured with more than one puncture. In this example, data sequence 438 may be punctured with two punctures 426 and 430. As depicted in FIG. 5, the first puncture ($p_1$) 426 may have length $L_{P1}$, while the second puncture ($p_2$) 430 may have a length $L_{P2}$.

In some embodiments, $L_{P1}$ and $L_{P2}$ may be of different lengths. Accordingly, the data sequence 438 may be dynamically segmented into three portions: a first segment 424, a second segment 428, and a third segment 432. As described above, by increasing the number of punctures (to any suitable number) and being able to dynamically change the parameters of each puncture, embodiments of the present disclosure provide greater security than conventional methods of segmenting data sequences.

FIG. 5 is another block diagram illustrating at least some example techniques for transmitting a secure frame, according to at least some embodiments. In some embodiments, an initiator (e.g., access control system 502) may determine puncturing parameters based at least in part on a desired link performance. In some embodiments, the link performance may be based at least in part on a range (e.g., a distance) between the access control system 502 (e.g., which may be similar to device 200 of FIG. 2) and a user device 508 (e.g., which may also be similar to device 200 of FIG. 2). As described above, the range may be correlated with an SNR. In some embodiments, a longer range may correspond to a lower SNR, for example, due to multi-path error, signal attenuation, and/or other signal interference. In contrast, in some embodiments, a shorter range may correspond to a higher SNR.

In some embodiments, the link performance may also be associated with a number of segments (e.g., punctures) within a data sequence. In some embodiments, a number of segments within a data sequence may be inversely correlated with an SNR per segment. For example, a data sequence that is partitioned into two (or more) segments via puncturing the data sequence (e.g., data sequence 438 of FIG. 4) may have a lower SNR per segment than a data sequence that is not punctured. In some embodiments, the SNR for each segment may be reduced by $10 \log_{10}(N)$ dB, where N is the number of segments of a particular data sequence. Accordingly, an initiator (e.g., access control system 502) may determine puncturing parameters based at least in part on one or more factors, including, but not limited to, a range between the two devices and/or a desired level of security (e.g., associated with a number of punctures and/or a location of each puncture). Thus, embodiments of the present disclosure may dynamically balance between a desired link performance and a desired level of security based at least in part on determining puncturing parameters, as illustrated further below.

Continuing with FIG. 5, in some embodiments, at time $T_0$, the access control system 502 may determine to disable puncturing of data sequence 506 based at least in part on a distance $D_1$ 504 between the access control system 502 and the user device 508. For example, the access control system 502 may determine that the distance 504 exceeds a certain threshold such that the frame does not require an elevated level of security (e.g., the user device 508 is not approaching the vehicle, and so the access control system 502 will not need to determine whether to unlock the car based on authenticating a secure frame). In another example, the access control system 502 may determine that the signal quality (e.g., SNR) is lower due in part to the longer range, and so the access control system 502 may determine to use a puncture-free data sequence to achieve the desired link budget.

In some embodiments, at time $T_1$, the access control system 502 may determine to enable puncturing, whereby punctured data sequence 518 may be generated based at least in part on a distance $D_1$ 510 between the access control system 502 and the user device 508. For example, the access control system 502 may determine that a distance D2 510 is within a certain threshold such that the frame should be processed using an elevated level of security (e.g., the user device 508 is approaching the vehicle, and so the access control system 502 may determine whether to unlock the vehicle door based at least in part on authenticating a secure frame). Based at least in part on this determined distance $D_2$ 510, the access control system 502 may determine puncturing parameters for puncturing a data sequence 518 of a secure frame. Similar to as described above in reference to FIG. 4, the access control system 502 may determine a location 514 to puncture the data sequence for generating punctured data sequence 518. In some embodiments, the access control system 502 may also determine (e.g., derive) respective locations for the first segment 512 and second segment 516 based at least in part on the location 514 of the puncture.

In some embodiments, the system may also determine lengths of the different segments (e.g., first segment 512 (with length $L_1$) and second segment 516 (with length $L_2$)), based at least in part on an acceptable balance between levels of security and link performance (e.g., SNR). For example, the access control system 502 may determine a first segment 512 of length $L_1$ for achieving a sufficient link budget to perform channel estimation. For example, a longer first segment 512 of length $L_1$ may provide for a greater link budget. The access control system 502 may also determine a second segment 516 of length $L_2$ that is sufficient to perform a consistency check of channel estimates. For example, the consistency check may be performed based at least in part on comparing a channel estimate for the first segment 512 and the second segment 516. The length $L_2$ of second segment 516 may therefore be chosen in a way that enables a sufficient consistency check to be performed. In some embodiments, the access control system 502 may also determine a second segment 516 of length $L_2$ that is sufficient to perform a confidence level check and/or NULL hypothesis test. In some embodiments, one or more of these tests may be based at least in part on channel estimates for the first segment 512 and/or the second segment 516. In some embodiments, the confidence level check, the NULL hypothesis test, the consistency check, and/or the channel estimates may be performed using conventional techniques. In some embodiments, the location 514 (e.g., position and/or length $L_p$) of puncture may then be determined (e.g., derived) based at least in part on the respective lengths ($L_1$, $L_2$) for the first segment 512 and the second segment 516. Thus, as described above, the access control system 502 may dynamically balance between a desired link performance and a desired level of security based at least in part on the puncturing parameters (e.g., enabling/disabling puncturing, and determining the puncture location and/or the length of each segment).

In some embodiments, the access control system 502 may use similar factors as described above to determine a number of punctures for a given data sequence. For example, as depicted in data sequence 438 of FIG. 4, more than one puncture may be determined (e.g., puncture 426 and puncture 430). In some embodiments, each of the punctures may be unequally spaced from one another or different respective lengths from one another. However, as noted above, the SNR for each segment in a data sequence may be reduced by 10 $\log_{10}(N)$ dB, where N is the number of segments. Thus, although an increased number of punctures may provide increased security (e.g., more segments), the access control system 502 may balance this with an acceptable link performance (e.g., associated with the SNR).

It should be understood that embodiments of the disclosure may also be performed with devices that are not configured to authenticate a secure frame based at least in part on a location of the puncture. For example, in the example of FIG. 5, the access control system 502 may be configured to process a punctured data sequence, and thus may determine to enable puncturing at time $T_1$. However, another access control system nearby may not be configured to process the punctured data sequence. When the user device 508 transmits a secure frame with a punctured data sequence 518, the other access control system may also receive the secure frame and may interpret the punctures as signal noise (similar to other noise). Thus, for example, the other access control system may still perform channel estimates, consistency checks, etc., even with a punctured data sequence.

Figure 6:
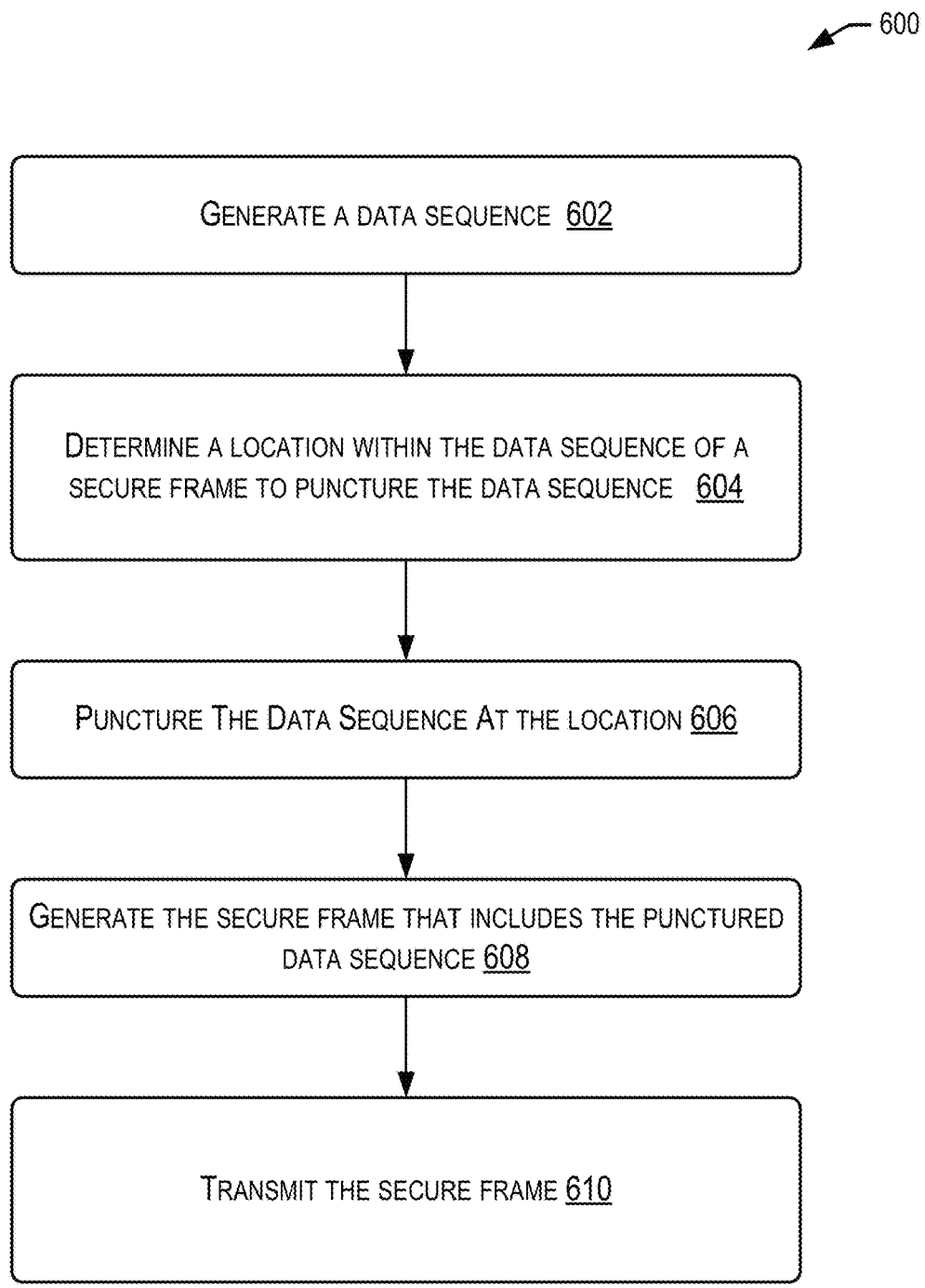
FIG. 6 is a simplified flow diagram illustrating an example process for transmitting a secure frame, according to some embodiment.
Figure 7:
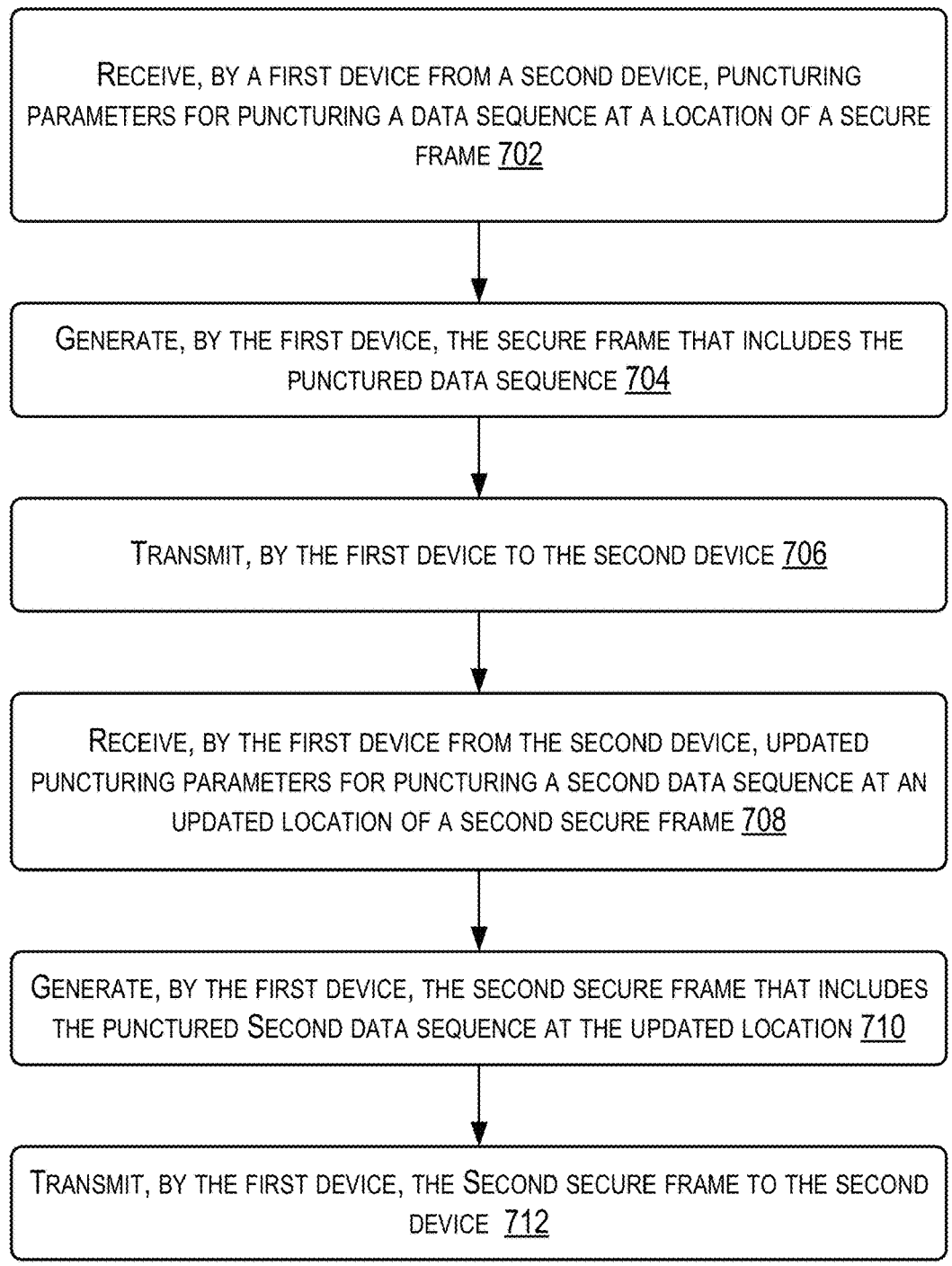
FIG. 7 is another simplified flow diagram illustrating another example process for transmitting a secure frame, according to some embodiments.

FIGS. 6 & 7 illustrate example flow diagrams showing respective processes 600 and 700 for transmitting a secure frame according to some embodiments, as described herein. These processes 600 and 700 are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, process 600 may be performed by a first device, which may be the device 200 of FIG. 2 (e.g., utilizing one or more of the modules described). The process may begin at block 602 where the first device (e.g., a sending device) generates a data sequence. In some embodiments, the data sequence may be generated based at least in part on one or more puncturing parameters. In some embodiments, the one or more puncturing parameters may be determined by the sending device or by the receiving device, whereby either device may operate as an initiator device.

At block 604, the process 600 may determine a location within the data sequence of a secure frame (e.g., a secure ranging frame) to puncture the data sequence. In some embodiments, the location may be determined based at least in part on the one or more puncturing parameters. In some embodiments, the one or more puncturing parameters may correspond to instructions for puncturing the data sequence with multiple punctures.

At block 606, the process 600 may puncture the data sequence at the location. In some embodiments, the location may correspond to a position within the data sequence to initiate the puncturing and a length of the puncture. Based on the puncturing location, the respective location of the segments may be determined (or vica versa).

At block 608, the process may generate a secure frame that includes the punctured data sequence. In some embodiments, the secure frame may be generated according to the IEEE 802.15.4z standard. For example, the secure frame may be according to one of the three frame formats depicted in FIG. 3. In some embodiments, the secure frame may be generated for any suitable context (e.g., pairing devices, sharing keys, transmitting passwords, general data transfer, etc.), and/or utilizing any suitable protocol (e.g., UWB, BLE, Wi-Fi, etc.).

At block 610, the process 600 may transmit the secure frame. In some embodiments, the secure frame may be transmitted to a second device for authentication. In some embodiments, the authentication may be based at least in part the location of the puncture within the punctured data sequence. In some examples, the second device may correspond to an access control system that may provide access to a resource upon authentication. For example, the access control system may be a vehicle locking system for a vehicle, and the resource may include unlocking the car doors to provide access to the car. In another example, the access control system may be a home appliance control system, and accessing the resource may involve illuminating a lightbulb. In some embodiments, the second device may be any suitable computing device that performs an operation upon authenticating the secure frame.

FIG. 7 is another simplified flow diagram illustrating another example process for transmitting a secure frame, according to some embodiments. In some examples, process 700 may be performed by a first device (e.g., a user device), which may be similar to the device 200 of FIG. 2 (e.g., utilizing one or more of the modules described). The process 700 may begin at block 702 by receiving from a second device puncturing parameters for puncturing a data sequence at a location of a secure frame. In some embodiments, the second device may be an access control system, which may be the device 200 of FIG. 2. In some embodiments, the puncturing parameters may be based at least in part on a range between the first device and the second device. In some embodiments, the range may be determined by either device. Also, although this example depicts the second device as an initiating device (e.g., determining puncturing parameters and sending them to the first device), in other embodiments, the first device may operate as an initiating device that determines to enable/disable puncturing, as well as the puncturing parameters (if enabled). In some embodiments, the puncturing parameters may be transmitted using a first layer wireless protocol such as BLE (e.g., via the first layer communication module 202-D1). In other embodiments, the puncturing parameters may be transmitted using a second layer wireless protocol such as UWB (e.g., via the second layer communication module 202-D2). In yet other embodiments, the parameters may be transmitted using multiple protocols. For example, the first layer wireless protocol may be used to share a cryptographic key (e.g., a seed) that is used to generate a data sequence, while the second layer wireless protocol may be used to updated the puncturing parameters as to the location of a puncture (e.g., on a per-cycle basis).

At block 704, the process 700 may generate the secure frame that includes the punctured data sequence. In some embodiments, this block may be similar to blocks 606-608 of FIG. 6.

At block 706, the process 700 may transmit the secure frame to the second device. In some embodiments, this block may be similar to block 610 of FIG. 6.

At block 708, the process 700 may receive from the second device updated puncturing parameters for puncturing a second data sequence at an updated location of a second secure frame. In some embodiments, as described in reference to FIG. 5, the updated puncturing parameters may be determined based on one or more factors. For example, the second device may determine that a range between the first device and the second device is greater or lesser than was previously determined. For example, a user holding the first device (e.g., mobile phone, wearable device, token, key fob, etc.) may be walking towards a vehicle (e.g., the second device). Accordingly, the updated puncturing parameters may, for example, determine a new location for a puncture within the second data sequence. In another example, the updated puncturing parameters may determine that the data sequence should be punctured with multiple punctures. For example, for yet additional security, the multiple punctures may be unequally spaced from one another or have different respective lengths from one another. In yet another example, where the first device may be traveling further from the second device, the second device may determine to disable puncturing. As described above, the puncturing parameters may be updated according to any suitable cadence (e.g., per cycle, or per session).

At block 710, the process 700 may generate the second secure frame that includes the punctured second data sequence at the updated location. In some embodiments, the updated location may be different from the location. In some embodiments, this block may be similar to blocks 606-608 of FIG. 6.

At block 712, the process 700 may transmit the updated secure frame. In some embodiments, this block may also be similar to block 610 of FIG. 6. In some embodiments, whereas at block 706 the second device may authenticate the secure frame based at least in part on the puncturing parameters (e.g., from block 702), at block 712, the second device may authenticate the second secure frame based at least in part on the updated puncturing parameters.

Illustrative techniques for wirelessly transmitting a secure ranging frame are described above. Some or all of these techniques may, but need not, be implemented at least partially by architectures such as those shown at least in FIGS. 1-7 above. While many of the embodiments are described above with reference to access control systems and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data to wirelessly transmit a secure frame for authentication. The present disclosure contemplates that in some instances, this gathered data may include personally identifiable information (PII) data that uniquely identifies or can be used to contact or locate a specific person. Such personal information data can include demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to obtain access to a resource that is control by an access control system.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to tracking a user's location (e.g., via the user's mobile device), the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method for wirelessly transmitting a secure frame, comprising:
    generating, by a wireless device, a data sequence;

determining, by the wireless device, a location within the data sequence of the secure frame to puncture the data sequence;

puncturing, by the wireless device, the data sequence at the location;

generating, by the wireless device, the secure frame comprising the punctured data sequence; and transmitting, by the wireless device, the secure frame.

2. The computer-implemented method of claim 1, wherein the location indicates at least one of: (1) a position within the data sequence to initiate the puncturing, or (2) a length of a puncture in the data sequence that corresponds to the puncturing.

3. The computer-implemented method of claim 1, wherein puncturing the data sequence comprises zeroing out one or more bits of the generated data sequence.

4. The computer-implemented method of claim 3, wherein the zeroed out bits correspond to a puncture in the punctured data sequence that corresponds to the puncturing, the puncture initiated at a position and continuing for a length within the punctured data sequence.

5. The computer-implemented method of claim 1, wherein the secure frame is transmitted using an ultra-wideband (UWB) protocol.

6. The computer-implemented method of claim 1, wherein the wireless device comprises a mobile phone.

7. A wireless device for wirelessly transmitting a secure frame, comprising:

a memory comprising computer-executable instructions; and one or more processors in communication with the memory and configured to access the memory and execute the computer-executable instructions to perform, at least:

generating a data sequence;

determining a location within the data sequence of the secure frame to puncture the data sequence;

puncturing the data sequence at the location;

generating the secure frame comprising the punctured data sequence; and transmitting the secure frame.

8. The wireless device of claim 7, wherein the memory comprises further computer-executable instructions that, when executed by the one or more processors, further cause the wireless device to perform, at least:

deriving the data sequence that comprises a cryptographically generated sequence of bits.

9. The wireless device of claim 7, wherein the location is determined based at least in part on a range that is associated with a signal-to-noise ratio (SNR) of a signal.

10. The wireless device of claim 7, wherein the memory comprises further computer-executable instructions that, when executed by the one or more processors, further cause the wireless device to perform, at least:

receiving information indicating that the secure frame has been authenticated by a second wireless device based at least in part on the location, wherein the authentication is performed within a secure ranging context.

11. The wireless device of claim 7, wherein the location is determined based at least in part on a range between the wireless device and a second wireless device.

12. The wireless device of claim 11, wherein determining the location further comprises: (1) transmitting to the second wireless device puncturing parameters for performing authentication of the secure frame, wherein the puncturing parameters include the location, or (2) receiving, from the second wireless device, a puncturing parameters message that includes the location for puncturing the data sequence.

13. The wireless device of claim 12, wherein the memory comprises further computer-executable instructions that, when executed by the one or more processors, further cause the wireless device to perform, at least:

receiving, from the second wireless device, a second puncturing parameters message including updated puncturing parameters for puncturing a second data sequence of a second secure frame; and determining an updated location within the second data sequence of the second secure frame to puncture the second data sequence based at least in part on the updated puncturing parameters.

14. The wireless device of claim 13, wherein the updated location is determined on a per-cycle basis or a per-session basis.

15. The wireless device of claim 13, wherein the updated location corresponds to a different location in the punctured second data sequence that is different from the location in the punctured data sequence.

16. The wireless device of claim 13, wherein the memory comprises further computer-executable instructions that, when executed by the one or more processors, further cause the wireless device to perform, at least:

generating the second data sequence;

determining the updated location within the second data sequence of the second secure frame to puncture the second data sequence, the updated location different from the location;

puncturing the second data sequence at the updated location;

generating the second secure frame that includes the punctured second data sequence; and transmitting the second secure frame to a third wireless device for authentication, the authentication based at least in part on the updated location within the punctured second data sequence.

17. The wireless device of claim 13, wherein the updated location and the location differ by at least one of: (1) a second position of a second puncture within the punctured second data sequence being different from a position of a puncture within the punctured data sequence, or (2) a second length of the second puncture within punctured second data sequence being different from a length of the puncture within the punctured data sequence.

18. One or more non-transitory computer-readable storage mediums comprising computer-executable instructions that, when executed by one or more processors, cause the one or more processors to perform, at least:

generating a data sequence;

determining a location within the data sequence of a secure frame to puncture the data sequence;

puncturing the data sequence at the location;

generating the secure frame comprising the punctured data sequence; and transmitting the secure frame.

19. The one or more non-transitory computer-readable storage mediums of claim 18, wherein the punctured data sequence includes at least three portions, comprising: (1) a first segment, (2) a puncture in the data sequence that corresponds to the puncturing, and (3) a second segment, wherein the puncture is included at the location within the data sequence between the first segment and the second segment.

20. The one or more non-transitory computer-readable storage mediums of claim 19, wherein at least one of: (1) a length of the first segment, or (2) a length of the second segment is determined based at least in part on a signal-to-noise (SNR) for authenticating the secure frame.

21. The one or more non-transitory computer-readable storage mediums of claim 18, wherein the punctured data sequence comprises a plurality of punctures.

22. The one or more non-transitory computer-readable storage mediums of claim 21, wherein punctures of the plurality of punctures are at least one of: (1) unequally spaced from one another within the punctured data sequence, or (2) of different respective lengths from one another.

* * * * *

UNITED STATES PATENT AND TRADEMARK OFFICE
CERTIFICATE OF CORRECTION

PATENT NO. : 11,223,956 B2  
APPLICATION NO. : 16/774165  
DATED : January 11, 2022  
INVENTOR(S) : Ayman F. Naguib and Arun Yadav Page 1 of 1

It is certified that error appears in the above-identified patent and that said Letters Patent is hereby corrected as shown below:

In the Claims

Column 29, Claim 20, Line 3, delete "noise (SNR) for authenticating" and insert --noise ratio (SNR) for authenticating--

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*